H. BOLTSHAUSER.
DEVICE FOR RECOOLING THE COOLING WATER OF STEAM CONDENSING PLANTS ON VEHICLES.
APPLICATION FILED AUG. 26, 1920.

1,402,043.

Patented Jan. 3, 1922.

Inventor
Heinrich Boltshauser
by Henry Orth Jr
Atty

UNITED STATES PATENT OFFICE.

HEINRICH BOLTSHAUSER, OF ZURICH, SWITZERLAND.

DEVICE FOR RECOOLING THE COOLING WATER OF STEAM-CONDENSING PLANTS ON VEHICLES.

1,402,043.  Specification of Letters Patent.  Patented Jan. 3, 1922.

Application filed August 26, 1920. Serial No. 406,183.

*To all whom it may concern:*

Be it known that I, HEINRICH BOLTSHAUSER, a citizen of the Republic of Switzerland, residing at Zurich, Hardturmstrasse 19, Zurich, Switzerland, have invented certain new and useful Improvements in a Device for Recooling the Cooling Water of Steam-Condensing Plants on Vehicles; and I do hereby declare the following to be a clear, full, and exact description of the invention, such as will enable others skilled in the art to which it appertains to make and use the same, reference being had to the accompanying drawing, and to letters or figures of reference marked thereon, which form a part of this specification.

This invention relates to improvements in a device for recooling the cooling water of steam-condensing plants on vehicles. According to the invention, the part of the device for effecting a rain-like distribution of the water to be cooled has the shape of a vaulted door which in its upper part and at the sides conforms at least approximately to the outline of the railway clearance gauge; and the interior of this structure forms a cooling channel with a free entrance and passage area for the cooling air that is as large as possible and through which the cooling air flows only once in a longitudinal direction. The rain-like distribution of the water to be cooled in the air-channel within the vaulted structure may be effected by a system of parallel longitudinally arranged pipes provided with many openings and arranged in said vaulted structure. The supply of the water to be cooled to the pipes arranged in a longitudinal direction may be effected by means of at least one vaulted channel. Such a supply channel may define the entrance opening of the air channel and the cross-section of the supply channel may have the shape of a trapezoid the width of which in the radial direction of the vault is comparatively small and one oblique side of which is directed towards the entrance of the air so that the entrance opening of the air-channel is funnel-shaped. The air-channel may have a horse-shoe-like cross-section and may inclose for the greatest part a water tank.

An exemplification of the invention is shown on the accompanying drawing.

Figure 3:
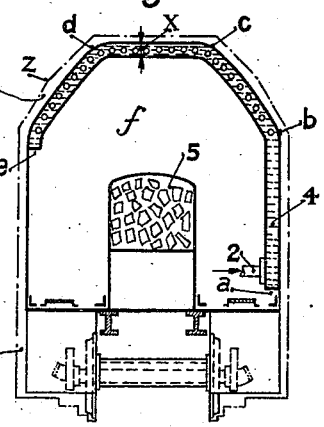
Fig. 3 illustrates a section along line 3—3 of Fig. 1, seen from the right.

The assumed direction of travelling of the tender is shown by arrow I. The path of the air through the air channel is indicated by arrows II, III and IV. At the outer shell 1 of the tender the distributing device for the water to be recooled is arranged. The warm water discharged from the condensing plant is supplied by means of a conduit 2 (Fig. 3) to a channel 4 (Figs. 3 and 1), which has in a vertical section transverse to the direction of travelling the shape of a vaulted door $a$—$b$—$c$—$d$—$e$ (Fig. 3).

Figure 1:
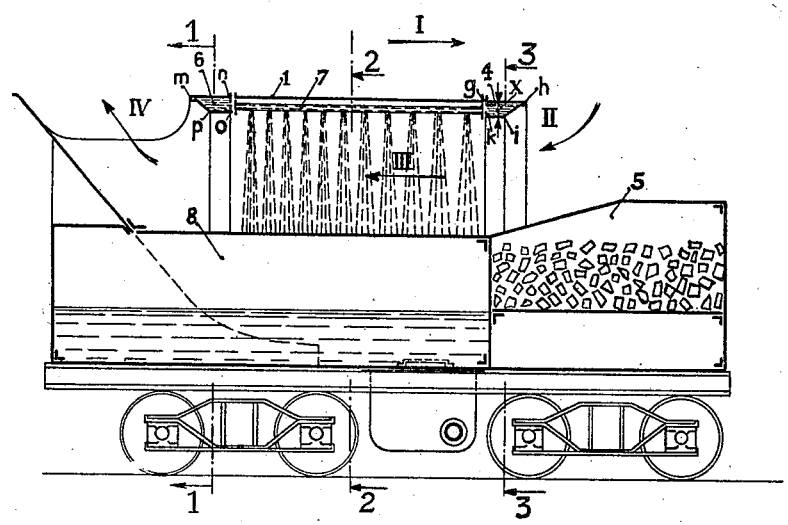
Fig. 1 is a vertical central section in a longitudinal direction through the tender of a steam locomotive, on which tender the recooling device for the cooling water of a condensing plant for the steam power engine of the locomotive, for instance of a steam turbine, is provided.
Figure 2:
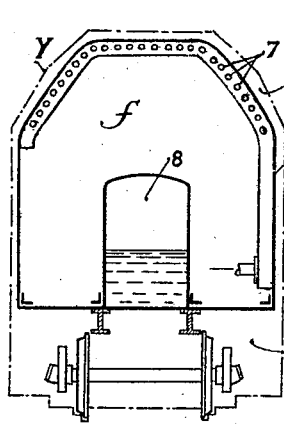
Fig. 2 is a section along line 2—2 of Fig. 1.

A section through this supply channel in the direction of travelling has the shape of a trapezoid $g$—$h$—$i$—$k$ as is shown in Fig. 1. This supply channel has only the small dimension $x$ seen in a radial direction. The corner $h$ of the trapezoidal section $g$—$h$—$i$—$k$ (Fig. 1) is pointed towards the front and the front wall of the supply channel 4 indicated in the vertical longitudinal section by the line $h$—$i$ tapers out like a funnel. Into this hollow space a coal bunker 5 projects and a horse-shoe-like funnel is kept free for the entrance of the air at II which offers very little resistance to the air. In the rear part of the cooling channel a second supply channel or header 6 is arranged which has also a cross-sectional shape of a trapezoid $m$—$n$—$o$—$p$. A section through this channel in the plane 1—1 seen from the right may have a similar shape to that shown in Fig. 3 in the case of the front supply channel 4. The two supply channels 4 and 6 are connected to each other by means of a number of pipes 7 the under part of which is provided with openings for the purpose of effecting a rain-like distribution of the water over the air-channel. The channels 4 and 6 present a structure in the shape of a vaulted door, that is to say, said channels and the pipes 7 are arranged and shaped so that they appear to be placed inside a small band of the shape of a vaulted door when looking along the vehicle as is shown in the sections of Figs. 2 and 3. In Fig. 2 the respective area of the band is indicated by showing the supply channel 6 in elevation and in Fig. 3 it is shown as a section through the supply channel 4 by horizontal hatching. In the latter case the hatching indicates at the same time the presence of water inside the supply channel 4. In Figs. 2 and 3 the chain-dotted lines $y$ and $z$ respectively denote the clearance gauge to which the device for distributing the water conforms as near as possible.

Within the air-channel a water supply tank 8 is so arranged that, as is shown in Fig. 2, the air-channel has a horse-shoe-like cross-section and surrounds the water tank for the greatest part. The cross-section of the cooler is so constructed that the cross-sectional area $f$, i. e., the area through which the air passes from end to end of the cooler, is at least equal to one-third of the area F of the cross-section of the railway clearance gauge indicated by the dotted line Y and which determines the permissible cross-sectional outline of the vehicle, consequently $f \geqq \frac{1}{3} F$.

I claim:

1. A recooling device for cooling the water of steam condensing plants on vehicles, comprising means for effecting a rain-like distribution of the water to be cooled arranged as a structure shaped like a vaulted door which conforms at least approximately in its upper part and at the sides to the railway clearance gauge, and a cooling channel formed within said structure having a free passage area for the cooling air current that is at least one-third of the cross-sectional area of said clearance gauge.

2. A device for recooling the cooling water of steam-condensing plants on vehicles, comprising means for effecting a rain-like distribution of the water to be cooled arranged as a structure shaped like a vaulted door which conforms at least approximately in its upper part and at the sides to the railway clearance gauge, which means include a system of parallel pipes arranged in the longitudinal direction of the vehicle within said vaulted-door shaped structure and fitted with many openings, and a cooling channel arranged in the longitudinal axis of the vehicle and formed by the interior of said structure with a free entrance and passage area for the cooling air current at least one-third the cross-sectional area of the clearance gauge and through which channel the cooling air flows only once in a longitudinal direction.

3. A device for recooling the cooling water of steam-condensing plants on vehicles, comprising means for effecting a rain-like distribution of the water to be cooled arranged as a structure shaped like a vaulted door which conforms at least approximately in its upper part and at the sides to the railway clearance gauge, which means include a system of parallel pipes arranged in the longitudinal direction of the vehicle within said vaulted-door shaped structure and fitted with many openings, and at least one channel of said vaulted-door shape for supplying the water to be cooled to said system of pipes, and a cooling channel arranged longitudinally of the vehicle and formed by the interior of said structure with a free entrance and passage area for the cooling air current at least one-third of the cross-sectional area of the clearance gauge and through which channel the cooling air flows only once in a longitudinal direction.

4. A device for recooling the cooling water of steam-condensing plants on vehicles, comprising means for effecting a rain-like distribution of the water to be cooled arranged as a structure shaped like a vaulted door which conforms at least approximately in its upper part and at the sides to the railway clearance gauge, which means include a system of parallel pipes arranged in the longitudinal direction of the vehicle within said vaulted-door shaped structure and having many openings, and at least one channel of said vaulted-door shape for supplying the water to be cooled to said system of pipes, and a cooling channel arranged in the longitudinal axis of the vehicle and formed by the interior of said structure with a free entrance and passage area for the cooling air current at least one-third the cross-sectional area of the clearance gauge and through which channel the cooling air flows only once in a longitudinal direction, said entrance opening of the air channel being formed by said vaulted-door shaped channel for supplying the water to be cooled to said system of pipes the cross-section of which channel has the shape of a trapezoid which is narrow in a radial direction and one corner of which is directed towards the front so that the entrance opening of the air-channel is funnel-shaped.

5. A device for recooling the cooling water of steam-condensing plants on vehicles, comprising means for effecting a rain-like distribution of the water to be cooled arranged as a structure shaped like a vaulted door which conforms at least approximately in its upper part and the sides to the railway clearance gauge, a cooling channel arranged in the longitudinal axis of the vehicle and formed by the interior of said structure with a free entrance and passage area for the cooling air-current of at lease one-third the cross-sectional area of the clearance gauge and through which channel the cooling air flows only once in a longitudinal direction, and a water tank arranged co-axially to the air-channel so that the free area of said channel is of a horse-shoe-like shape and the vaulted-door like structure encloses said water tank for the greatest part.

In testimony that I claim the foregoing as my invention, I have signed my name.

HEINRICH BOLTSHAUSER.